US006360405B1

(12) United States Patent
McDaid et al.

(10) Patent No.: US 6,360,405 B1
(45) Date of Patent: Mar. 26, 2002

(54) SECURITY ANCHOR/TETHER ASSEMBLAGE FOR PORTABLE ARTICLES

(75) Inventors: Cornelius McDaid, Dorchester; John Ristuccia, Sharon, both of MA (US)

(73) Assignee: Kryptonite Corporation, Canton, MA (US)

( * ) Notice: Subject to any disclaimer, the term of this patent is extended or adjusted under 35 U.S.C. 154(b) by 0 days.

(21) Appl. No.: 09/658,717

(22) Filed: Sep. 11, 2000

Related U.S. Application Data

(63) Continuation-in-part of application No. 09/605,913, filed on Jun. 28, 2000, which is a continuation-in-part of application No. 09/334,570, filed on Jun. 21, 1999, now Pat. No. 6,081,974.

(51) Int. Cl.[7] .......................... F16B 41/00; E05B 73/00

(52) U.S. Cl. .......................... 24/265 R; 24/669; 24/95; 70/58

(58) Field of Search .................... 24/265 CD, 265 AL, 24/265 H, 682.1, DIG. 53, DIG. 31, DIG. 60, 669, 95, 105, 90.1, 92–94, 3.1, 3.7, 3.5, 3.9, 573.09; 411/400, 345, 340; 70/58, 57, 232, DIG. 57; 248/225.11, 336, 229.16, 229.26; 52/125.4, 705

(56) References Cited

U.S. PATENT DOCUMENTS 3,463,525 A * 8/1969 Stewart ................. 411/176 X
4,490,065 A * 12/1984 Ullrich et al. .......... 411/400 X
5,327,752 A * 7/1994 Myers et al. .................. 70/58
5,381,685 A * 1/1995 Carl et al. .................. 70/57 X
5,502,989 A * 4/1996 Murray, Jr. et al. ............. 70/58
6,212,918 B1 * 4/2001 Kravtin ..................... 70/58 X

* cited by examiner

*Primary Examiner*—Robert J. Sandy
(74) *Attorney, Agent, or Firm*—Morse, Altman & Martin

(57) ABSTRACT

An anchor/tether assemblage for use with a security slot in a portable electronic article that provides a securement for securely attaching the portable article to a stationary fixture. The anchor includes an internal member, an external member, and a means for securing them together. The internal member includes a right angle portion inside the portable article that is approximately parallel to the inside wall. The external member has a clamping surface that abuts the outer surface of the portable article and a knob for attachment of the tether. The external member has an aperture into which the internal member fits and is removably secured by a screw that extends through the external member and into a threaded hole in the internal member. The tether denies access to the screw when attached to the knob. The tether has a locking head with an opening for attachment to the knob and a cable extending from the locking head. Ball bearings extend securely into an annular groove in the knob when the locking head is in the locked state, and which are removable from the annular groove when in the unlocked state.

11 Claims, 6 Drawing Sheets

SECURITY ANCHOR/TETHER ASSEMBLAGE FOR PORTABLE ARTICLES

RELATED APPLICATION

The present application is a continuation-in-part application of application Ser. No. 09/605,913, dated Jun. 28, 2000, for SECURITY ANCHOR FOR PORTABLE ARTICLES in the names of Cornelius McDaid and John Ristuccia, which is a continuation-in-part application of application Ser. No. 09/334,570, dated Jun. 21, 1999, for SECURITY ANCHOR FOR PORTABLE ARTICLES in the name of Cornelius McDaid, now U.S. Pat. No. 6,081,974.

BACKGROUND OF THE INVENTION

1. Field of the Invention

The present invention relates to security for portable articles, more particularly, to an apparatus for the prevention of physical theft or removal of portable articles.

2. The Prior Art

As portable computers and other expensive electronic equipment have become more common, theft of such equipment has increased. There are a number of different types of devices on the market to deter such thefts. Most of these devices are either bulky, so that they are not particularly portable, or they rely on the small rectangular slot that is being manufactured into portable computers. The security devices that do not rely on the slot typically encase the portable article so that it cannot be operated while the security device is in use.

A number of locking devices have been developed to removably attach to the portable article using the slot. However, many of these devices are unitary, that is, they consist of only a single component. This means that the device must be inserted into the slot every time it is used. Since the cases of these portable articles are typically composed of a plastic, constant attaching and removal of the locking device causes wear and tear to the slot, potentially destroying the it after enough use. Thus, there continues to be a need for a device that allows a robust security attachment to a portable article that also allows the article to be operated normally and that does not require attachment and removal from the slot each time the security device is used.

SUMMARY OF THE INVENTION

An object of the present invention is to provide an apparatus for use with a preexisting slot in a portable article that provides an attachment to a stationary location for robust security.

Another object is to provide a security apparatus that allows the portable article to be used normally when the article is secured.

A further object is to provide a security apparatus that can remain attached to the article when not in use. Minimizing wear and tear of the slot.

The present invention is an anchor/tether assemblage for use with the security slot found on many portable electronic device, particularly laptop computers. The anchor component includes an internal member, an external member, and a securement for securing the two together. The internal member extends into the security slot with a retaining portion that curves approximately 90° to approximately parallel with the inside wall of the portable article. The internal member includes an external member engagement portion that extends externally from the slot for securing to the external member.

The external member has an aperture into which the external member engagement portion fits. Preferably, the external member engagement portion and aperture are keyed so that the external member cannot rotate about the internal member. The external member has a clamping surface that abuts the outer surface of the portable article. The clamping surface extends completely around the slot or it may only extend as wings parallel to the retaining portion of the internal member.

The external member is secured to the internal member permanently, such as by weld, rivet, epoxy, and mating latches, etc., or removably. A removable securement must not be accessible when a security device is engaged with the external member. One removable securement is a screw that extends through the external member and into a threaded hole in the internal member. The threaded hole may extend completely through the internal member. The external member is designed to deny access to the screw head when the securing device is engaged with the external member.

The external member provides an anchor for removably attaching the tether. A first configuration is knob with an annular groove. In a second configuration, the securement screw head forms the top of a knob. In a third configuration, the securement screw head forms the top of a knob and the annular groove is formed from the bottom of the head and an annular cutout in the top rim of the external member.

The tether includes a locking head and a cable. The cable is a braid with a loop at one end and enclosed by an optional sheath.

The locking head has a housing, eyelet, cup, cylinder, and barrel. The housing has an opening for receiving the anchor knob. In one configuration, the opening is round to mate with a round external member skirt, which is the outer wall adjacent to the clamping surface. In another configuration, the opening is shaped with peaks and valleys to mate with the valleys and peaks of the external member skirt, so that the locking head cannot rotate relative to the anchor.

The cup within the opening fits closely over the knob. The cup has a set of apertures into which fit ball bearings. Ramped grooves in the housing are aligned with the apertures. In the unlocked position, the ball bearings fit into the deeper section of the grooves. As the cup rotates to a locked state, the groove becomes more shallow, pushing the ball bearing securely into the knob annular groove.

The cup is rotated by the cylinder which, along with the barrel, constitute the locking mechanism. The design of the cylinder/barrel combination is well known in the art. A ridge extending from the barrel into a notch in the edge of the cup act as a stop so the at the cup does not rotate beyond the locked and unlocked states.

The eyelet attaches the cable to the locking head. The eyelet has a ring that fits into an annular groove in the outside surface of the housing that allows the eyelet to swivel freely about the housing.

Other objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein.

DETAILED DESCRIPTION

Figure 1:
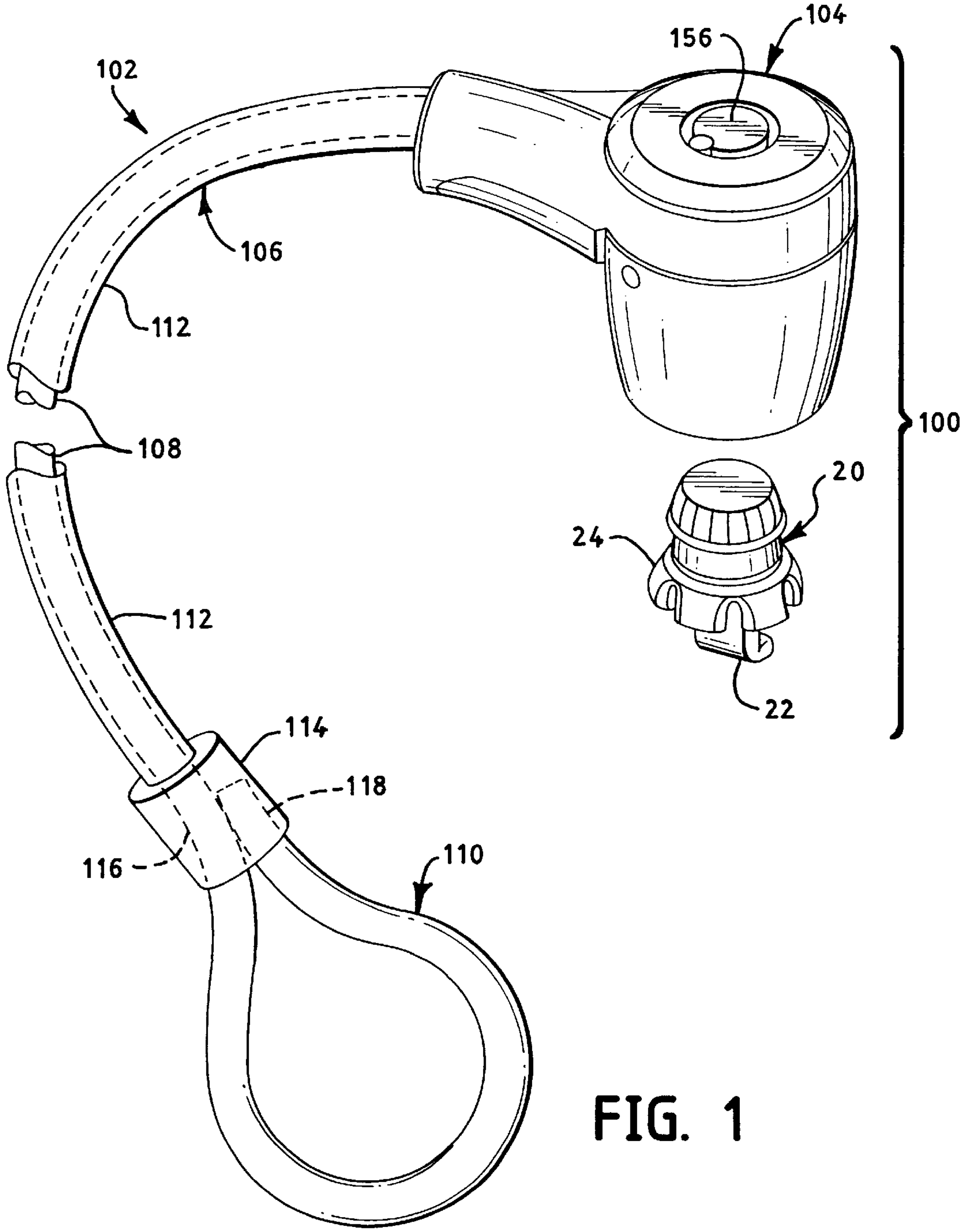
FIG. 1 is a perspective view of the security anchor/tether assemblage of the present invention.

The security anchor/tether assemblage 100 of the present invention, shown in FIG. 1, is used to secure the portable article 10 to a stationary fixture 6, such as a table leg 8. The assemblage 100 is intended for use in conjunction with a generally rectangular slot 12 in the wall of the article 10 to be secured. These slots 12 are being manufactured into portable articles, such as laptop computers, in known standard dimensions.

Anchor

The anchor 20 of the assemblage of the present invention includes an internal member 22, an external member 24, and a means 26 for securing the two together. The internal member 22 includes a retaining portion 32, a slot engagement portion 34, and an external member engagement portion 36. The slot engagement portion 34 resides in the slot 12 when the anchor 20 is installed. The slot engagement portion 34 has a cross-sectional shape and size that are approximately the same as that of the slot 12 so that there is minimal movement of the internal member 22 within the slot 12 and portable article 10. The retaining portion 32 extends from slot engagement portion 34 at approximately a right angle, where the inner surface 30 of the retaining portion 32 makes contact with the inner surface 16 of the article wall 18 when the anchor 20 is installed. Preferably, the outer corner 38 of the junction of the slot engagement portion 34 and the retaining portion 32 is curved for ease in insertion into the slot 12, as described below.

Optionally, the external member retaining portion 36 includes ears 40 to prevent the internal member 22 from falling into the slot 12 while the anchor 20 is being installed. The ears 40 extend away from the external member retaining portion 36, providing surfaces 42 parallel to the outer surface 14 of the article 10, so that when the internal member 22 is inserted into the slot 12 for installation, the surfaces 42 block the internal member 22 from moving too far into the slot 12.

The external member 24 secures the internal member 22 into the slot 12 and provides an anchor 44 for attaching the tether 102. The external member 24 has an aperture 46 into which the external member engaging portion 36 is inserted. Preferably, the external member engaging portion 36 and aperture 46 are keyed in a complementary fashion so that the external member 24 cannot rotate about the internal member 22. If the external member 24 is allowed to so rotate and depending upon the manner in which the external member 24 and internal member 22 are secured together, it may be possible to remove the external member 24 when such is not desired. In one configuration, shown in FIG. 2, the key takes the form of a flat surface 48 on the external member engaging portion 36 and a mating flat surface 50 in the aperture 46.

The external member 24 includes a clamping surface 52 that abuts the outer surface 14 of the portable article 10 adjacent to the slot 12 when the anchor 20 is installed. The clamping surface 52 extends in enough of an arc around the slot 12 in order to provide adequate strength to the anchor 20.

Figure 2:
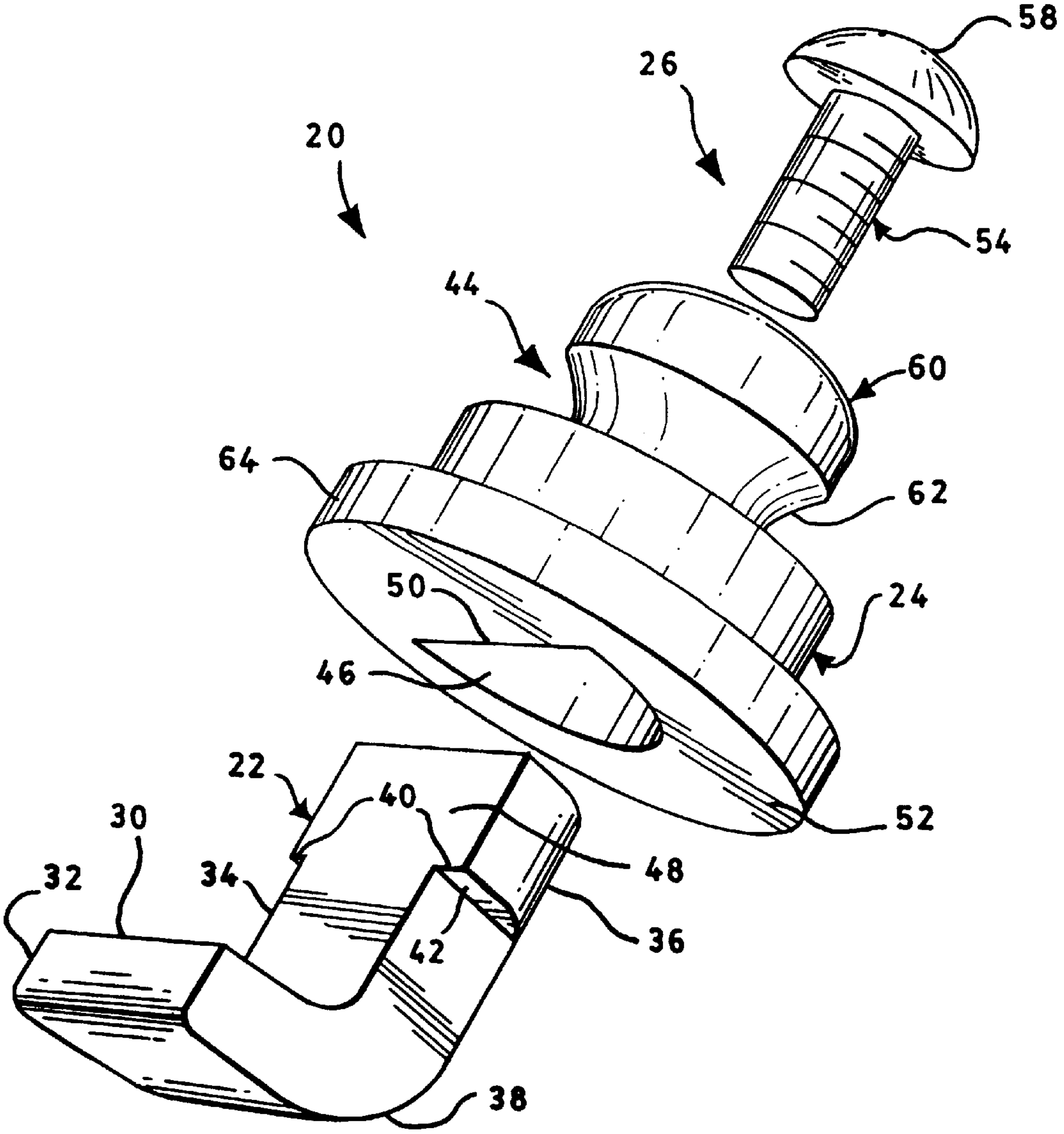
FIG. 2 is an exploded, perspective view of a configuration of the anchor of FIG. 1.
Figure 4:
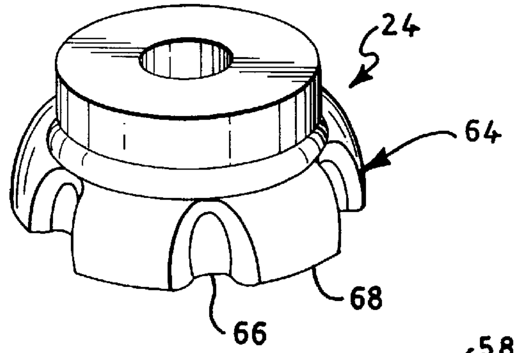
FIG. 4 is a perspective view of another embodiment of the external member.

The skirt 64, that portion of the outside wall of the external member 24 adjacent to the clamping surface 52, may be smooth, as in FIG. 2, or it may be shaped, as in FIG. 4. The shaped skirt 64 includes valleys 66 and peaks 68 that mate with complementary peaks and valleys of the locking head, as described below.

The security anchor 20 of the present invention is held in the slot 12 by clamping the wall 18 of the portable article 10 between the retaining portion 32 and the clamping surface 52. The external member 24 is secured to the internal member 22 either permanently or removably. A permanent securement can be effected in any number of ways, including by weld, rivet, epoxy, and mating latches on the internal member 22 and external member 24. All appropriate ways of effecting a permanent securement are contemplated by the present invention.

Figure 3:
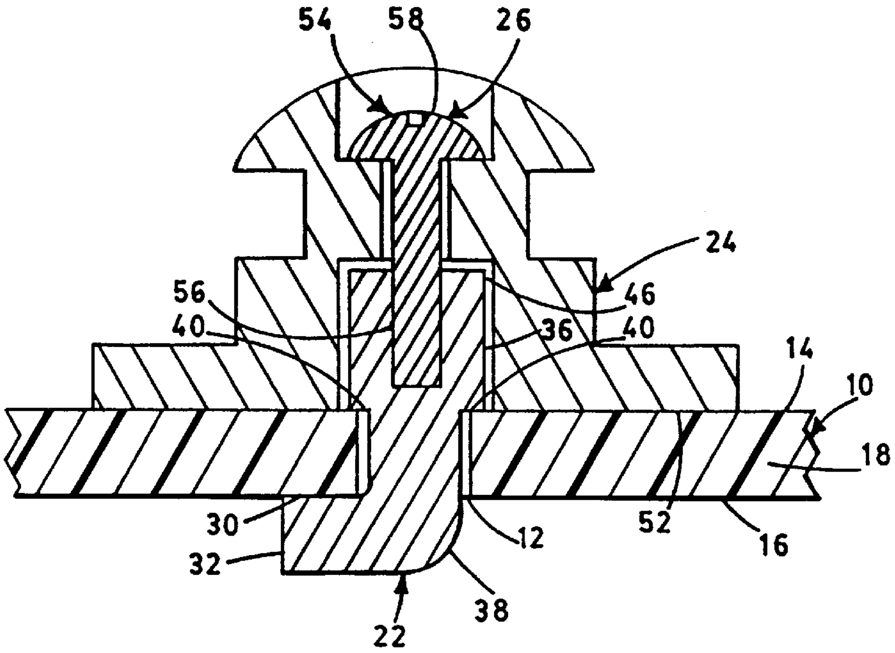
FIG. 3 is a cross-sectional side view of the anchor installed in a portable article and showing configurations of different aspects of the anchor.
Figure 5:
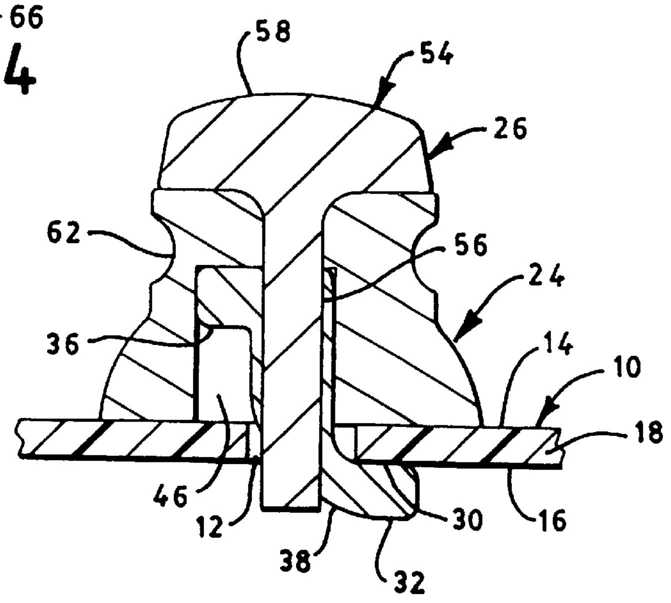
FIG. 5 is a cross-sectional side view of another configuration of the securement.

The present invention also contemplates that a removable securement can be effected in any appropriate manner. One caveat is that the removable securement cannot be accessed when the tether 102 is engaged with the external member 24. The preferred means to effect a removable securement is to use a screw 54 that extends into the aperture 46, which extends completely through the external member 24, and into a threaded hole 56 in the internal member 22. In the configuration of FIG. 3, the threaded hole 56 extends part way into the internal member 22. In the configuration of FIG. 5, the threaded hole 56 extends completely through the internal member 22. Extending the hole 56 completely through the internal member 22 provides several advantages over the configuration of FIG. 3. The first advantage is that the security anchor 20 can be completely assembled prior to installation. For this capability, the aperture 46 into which the internal member 22 resides is relatively deep into the external member 24 so that the external member engaging portion 34 of the internal member 22 is relatively long. The internal member 22 is inserted into the aperture 46 and the screw 54 is started into the threaded hole 56 enough to retain the internal member 22 in the aperture 46, as in FIG. 6. The size of the gap 68 between the clamping surface 52 of the external member 24 and the retaining portion 32 of the internal member 22 allows the internal member 22 to be pivoted into the slot 12. The clamping surface 52 is placed against the wall 18 of the portable article 10, and the screw 54 is tightened until the inner surface 30 of the retaining portion 32 is pulled against the inner surface 16 of the wall 18. Whether this capability can be utilized in any particular situation depends on the characteristics of the slot 12, such as how thick the wall 18 is at the slot 12 and whether there are any external components of the portable article 10 close enough to the slot to impede pivoting the security anchor 20 into the slot.

The second advantage to the configuration of FIG. 5 is that the screw 54 makes it more difficult to remove the security anchor 10 from the slot 12 without for disassembling the security anchor. If a person tries to remove the security anchor 10 of FIG. 3 by, for example, pivoting the security anchor 10 counterclockwise, the curve if the outer corner 38 of the junction of the slot engagement portion 34 and the retaining portion 32 will not necessarily provide the greatest deterrent to removal. On the other hand, the screw 54 of FIG. 5 extends vertically into the portable article 10, well below the level of the inner surface 16 of the wall 18. Since the screw 54 is vertical and not curved, it provides a greater impediment to pivoting the inner member 22 counterclockwise out of the slot 12 without first disassembling the security anchor 10.

Preferably, the wall 18 is tightly clamped so that any wear of the wall 18 in the vicinity of the slot 12 is minimized. The depth of the threaded hole 56 into which the screw 54 is turned allows for variation in the thickness of the article wall 18 from portable article to portable article. However, it is also contemplated that there will be situations where, regardless of the foreseen variations in the wall 18 thickness, the wall 18 will not be tightly clamped. In these situations, there will be some "play" between the retaining portion 32, the clamping surface 52, and wall 18. Alternatively, the hole 56 of FIG. 5, extending completely through the internal member 22, which would essentially eliminate any play, regardless of the thickness of the wall 18.

It is also contemplated that the screw head 58 may be external to the aperture, as in FIG. 5. In this case, the tether 102 covers the screw head 58 itself to prevent removal of the screw 54.

The external member 24 is designed to deny access to the screw head 58 by having the tether 102 cover enough of the aperture 46 to prevent removal of the screw 54.

Figure 7:
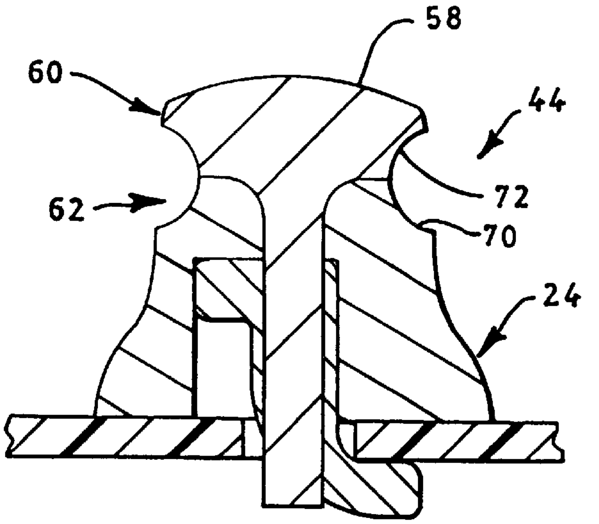
FIG. 7 is a cross-sectional side view of another configuration of the anchor.

The anchor device 20 of the present invention provides a knob 60 with an annular groove 62 for removably attaching the tether 102. In one configuration, shown in FIGS. 2 and 3, the knob 60 is formed in the external member 24. In another configuration, shown in FIG. 5, the top of the knob 60 is the screw head 58 and the groove 62 is formed in the external member 24. In a third configuration, shown in FIG. 7, the top of the knob 60 is the screw head 58 and the groove 62 is formed from a curve 70 in the external member 24 and the bottom surface 72 of the screw head 58.

The components of the anchor 20 are preferably composed of materials that cannot be easily disabled. In fact, the preferred materials are stronger than the plastic case of the typical portable article so that the case will be destroyed before the anchor 10 of the present invention.

Tether

The tether 102 of the assemblage of the present invention includes a locking head 104 and a cable 106. The cable 106 includes a braid 108, a loop 110, and an optional sheath 112. The braid 108 is preferably composed of a plurality of intertwined, small gauge filaments. The filaments are preferably composed of any material suitable to a vehicle lock, for example, hardened steel, a metal alloy, a tough composite such as KEVLAR®, or a combination thereof. Several constructions for the braid 108 are contemplated. It can be constructed of a single layer, for example, KEVLAR® and hardened steel filaments intertwined throughout the diameter of the braid. The braid 108 can also be constructed in multiple discrete layers, for example, an inner layer of braided hemp rope and an outer layer of braided hardened steel filaments. Any of the layers can be any combination of the materials described above.

The loop 110 is formed at one end of the cable 106 by curling one end segment of the braid 108 back until it is parallel to and contiguous with an inner segment of the braid 108. As in FIG. 1, a swage 114 encompasses the contiguous segments of braid 116, 118 and is compressed under high pressure to form a permanent connection. The loop 110 is large enough for the locking head 104 to pass through but small enough so that the portable article 10 cannot pass through.

Surrounding the exposed portions of the braid 108 is an optional sheath 112. The sheath 112 is composed of a material that protects the surfaces of the stationary object to which the tether 102 is attached. In one embodiment, the sheath 112 is composed of a soft plastic, such as vinyl. In another embodiment, the sheath 112 is composed of a material harder than vinyl, such as nylon or polypropylene, that is woven into a flexible cylindrical mesh. The mesh structure allows the tether 102 extensive flexibility when sheathed, and the harder nylon or polypropylene material gives the sheath 112 a much better wearability than the softer vinyl.

Figure 8:
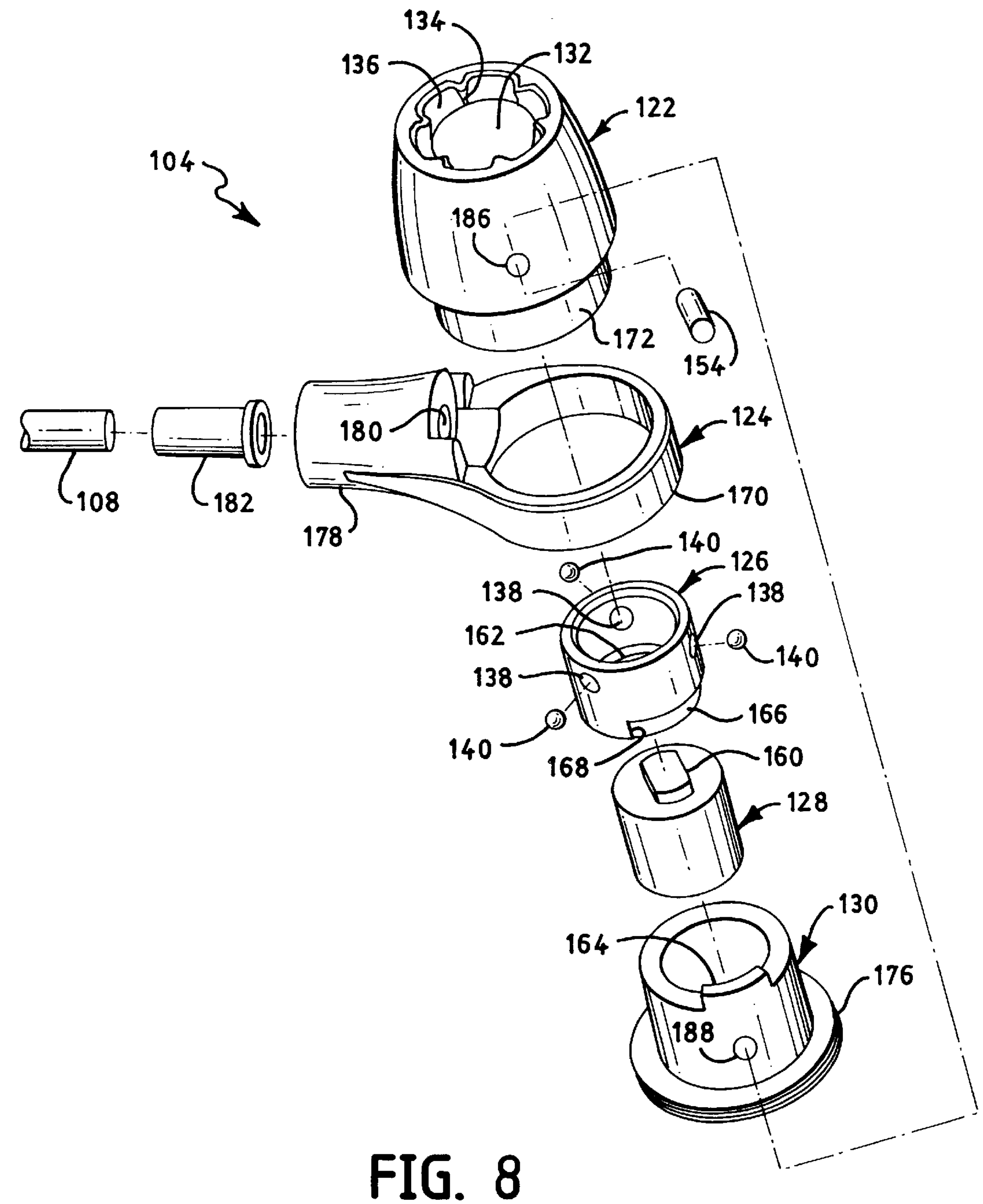
FIG. 8 is an exploded view of the locking head.
Figure 9:
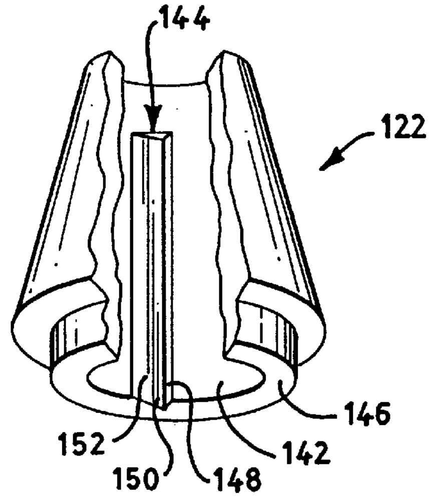
FIG. 9 is a cut-away view of the locking head housing.

The locking head 104 is composed of a number of components, including a housing 122, an eyelet 124, a cup 126, a cylinder 128, and a barrel 130. The housing 122 is the outer component of the locking head 104. The outer end has an opening 132 for receiving the anchor knob 60. In one configuration, the opening 132 is round to mate with a round external member skirt 64. In another configuration, shown in FIGS. 8, the opening 132 is shaped with peaks 134 and valleys 136 to mate with the valleys 66 and peaks 68 of the external member skirt 64 of FIG. 4. With this configuration, the locking head 104 will not rotate relative to the anchor 20 when they are engaged. By preventing such rotation, stresses on the relatively small anchor 20 caused by moving the portable article 10 while the tether 102 remains attached to the stationary fixture 6 are reduced. Since these stresses are transferred to the portable article 10, there is less likelihood that inadvertent damage will be caused to the portable article 10.

Inside the housing 122 is the cup 126. The cup 126 fits closely over the knob 60 when the tether 102 is engaged with the anchor 20. Within the cup 126 are a set of apertures 138, typically three, into which fit ball bearings 140. In the inside surface 142 of the housing 122 and aligned with the apertures 138 are grooves 144. Each groove 144 ramps circumferentially into the inner surface 142 to a wall 148. In the unlocked position, the ball bearings 140 reside within the deeper section 150 of the grooves 144 at the wall 148. As the cup 126 is rotated to a locked state, the groove bottom 152 pushes the ball bearing 140 securely into the annular groove 62 of the knob 60. As the cup 140 is rotated in the opposite direction to the unlocked state, the ball bearing 140 becomes aligned with the groove deep section 150 so that the ball bearing 140 will retract from the anchor annular groove 62 when the locking head 104 is removed from the knob 60. The groove 144 extends axially from the end 146 of the housing 122 so that the cup 126 with the ball bearings 140 installed in the apertures 138 can be inserted into the housing 122 during assembly.

The cup 126 is rotated by the cylinder 128. The cylinder 128 rotates within the barrel 130, which is permanently attached and fixed relative to the housing 122 by a pin 154 press fit into a hole 186 in the housing 122 and a hole 188 in the barrel 130. The design of the cylinder 128/barrel 130 combination is well known in the art. The cylinder 128 includes a keyway 156 into which a key 158 is inserted. Rotating the key 158 also causes the cylinder 128 to rotate between the locked state and unlocked state. Opposite the keyway 156 on the cylinder 128 is a shaped protrusion 160 which mates with a matching depression 162 in the cup 126, causing the cup 126 to rotate with the cylinder 128.

A stop prevents the cylinder 128/cup 126 combination from rotating beyond the locked an unlocked states. The stop comprises a ridge 164 extending from the barrel 130 into a notch 166 in the edge of the cup 126. As the cylinder 128/cup 126 combination rotates, the ridge 164 eventually contacts an end 168 of the notch 166, preventing further rotation. This occurs for rotation in either direction.

The last component of the locking head 104 is the eyelet 124, which attaches the cable 106 to the locking head 104. The eyelet 124 has a ring 170 that fits into an annular groove 172 in the outside surface of the housing 122. The inside diameter of the ring 170 is slightly larger than the outside diameter of the annular groove 172 so that the eyelet can swivel freely about the housing 122. A lip 176 extending radially from the barrel 130 secures the ring 170 in the groove 172, while allowing the eyelet 124 to swivel about the housing 122.

Extending from the ring 170 is an arm 178. The arm 178 includes an axial bore 180 through which the cable 106 extends. A swage 182 is clamped to the end of the cable 106 top prevent the cable 106 from being pulled back through the bore 180 and from the eyelet 124.

OPERATION

The anchor of FIG. 2 is installed by curling the retaining portion 32 and slot engaging portion 34 of the internal member 22 into the slot 12, fitting the external member aperture 46 onto the external member engaging portion 36 of the internal member 22, and securing the external member 24 to the internal member 22 with the screw 58.

Figure 6:
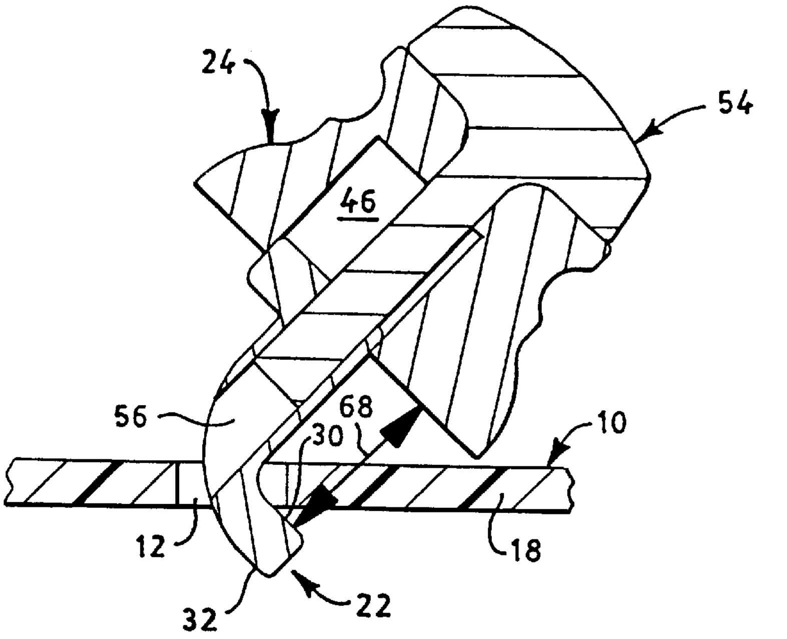
FIG. 6 is a cross-sectional side view of the configuration of FIG. 4 showing the anchor being installed.

The anchor of FIG. 5 is installed by first inserting the internal member 22 into the aperture 46 and starting the screw 54 into the threaded hole 56 enough to retain the internal member 22 in the aperture 46, as in FIG. 6. Then the retaining portion 32 of the internal member 22 is pivoted into the slot 12, and the screw 54 is tightened until the security anchor 20 is secured to the portable article 10.

Figure 10:
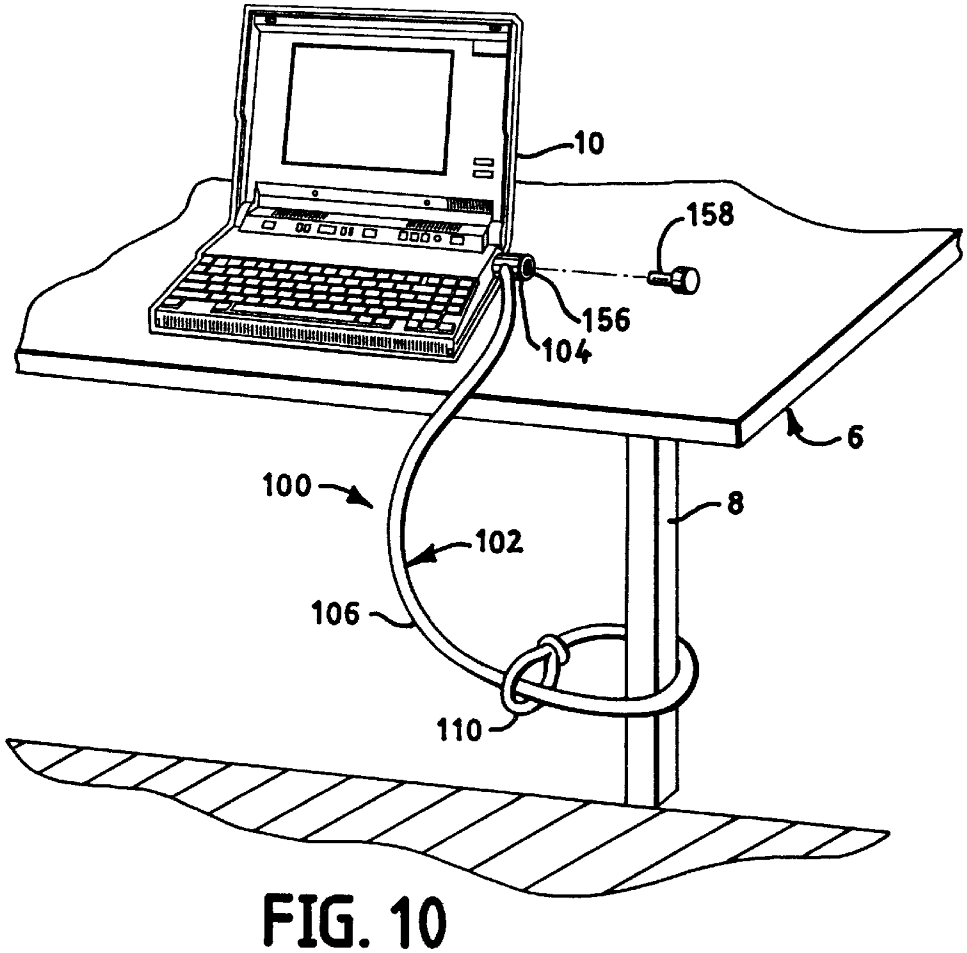
FIG. 10 is a perspective view of the assemblage in use.

The tether 102 is attached to the stationary fixture 6. In one method of attaching, shown in FIG. 10, the cable 106 is looped around a table leg 8 and the locking head 104 is passed through the loop 110. The locking head 104 is installed on the anchor 20 by inserting the key 158 into the keyway 156 and rotating the cylinder 128 until the ball bearings 140 can retract into the cup apertures 138. Then the locking head 104 is placed on the anchor 20 and the key 158 is rotated back to the closed position, securing the ball bearings 140 in the knob annular groove 62. The tether 102 is removed by the reverse operation.

Thus it has been shown and described a portable article security anchor/tether assemblage which satisfies the objects set forth above.

Since certain changes may be made in the present disclosure without departing from the scope of the present invention, it is intended that all matter described in the foregoing specification and shown in the accompanying drawings be interpreted as illustrative and not in a limiting sense.

What is claimed is:

1. An anchor/tether assemblage adapted for use with a portable article having a standardized security slot, said assemblage comprising:

(a) an anchor having an internal member, an external member, and a securement for securing said external member to said internal member;

(b) a tether having a locking head and a cable extending from said locking head, said locking head including an opening;

(c) said internal member including a slot engaging portion, a retaining portion, and an external member engaging portion, said slot engaging portion adapted to reside within said slot, said retaining portion adapted to reside within said article and extending at an approximately right angle from said slot engaging portion for contact with said article;

(d) said external member including a clamping surface for contact with said article, an aperture in said clamping surface for receiving said external member engaging portion, and a knob for receiving said locking head opening; and (e) said locking head having a locked state wherein said locking head is secured to said knob, and an unlocked state wherein said locking head can be installed on and removed from said knob.

2. The assemblage of claim 1 wherein said securement is removable and is inaccessible when said locking head is installed on said knob, said securement including said aperture extending through said external member and a removable screw extending through said aperture into a threaded hole in said internal member, said screw having a screw head.

3. The assemblage of claim 2 wherein said threaded hole extends completely through said internal member and said screw extends completely through said threaded hole when said anchor is installed in said slot.

4. The assemblage of claim 2 wherein said screw head is completely within said aperture when said anchor is installed in said slot.

5. The assemblage of claim 2 wherein said screw head is outside of said aperture when said anchor is installed in said slot.

6. The assemblage of claim 1 wherein said external member includes a skirt adjacent to said clamping surface, said skirt being shaped with peaks and valleys, and said locking head opening includes complementary valleys and peaks, whereby when said locking head is installed on said knob, said peaks and valleys mate, preventing said locking head from rotating relative to said anchor.

7. The assemblage of claim 1 wherein said knob includes an annular groove and said locking head includes ball bearings that extend securely into said annular groove when said locking head is in said locked state and which can be retracted from said annular groove when said locking head is in said unlocked state.

8. An anchor/tether assemblage adapted for use with a portable article having a standardized security slot, said assemblage comprising:

(a) an anchor having an internal member, an external member, and a securement for securing said external member to said internal member;

(b) a tether having a locking head and a cable extending from said locking head, said locking head including an opening;

(c) said internal member including a slot engaging portion, a retaining portion, and an external member engaging portion, said slot engaging portion adapted to reside within said slot, said retaining portion adapted to reside within said article and extending at an approximately right angle from said slot engaging portion for contact with said article;

(d) said external member including a clamping surface for contact with said article, an aperture in said clamping surface for receiving said external member engaging portion, a skirt adjacent to said clamping surface, and a knob for receiving said locking head opening;

(e) said locking head having a locked state wherein said locking head is secured to said knob, and an unlocked state wherein said locking head can be installed on and removed from said knob;

(f) said skirt being shaped with peaks and valleys, said locking head opening including complementary valleys and peaks, whereby when said locking head is installed on said knob, said peaks and valleys mate, preventing said locking head from rotating relative to said anchor; and (g) said securement being removable and inaccessible when said locking head is installed on said knob, said securement including said aperture extending through said external member, a removable screw extending through said aperture into a threaded hole in said internal member, said threaded hole extending completely through said internal member, and said screw extending completely through said threaded hole when said anchor is installed in said slot, said screw having a screw head.

9. The assemblage of claim 8 wherein said screw head is completely within said aperture when said anchor is installed in said slot.

10. The assemblage of claim 8 wherein said screw head is outside of said aperture when said anchor is installed in said slot.

11. The assemblage of claim 8 wherein said knob includes an annular groove and said locking head includes ball bearings that extend securely into said annular groove when said locking head is in said locked state and which can be retracted from said annular groove when said locking head is in said unlocked state.

* * * * *